United States Patent
Pelekis

(10) Patent No.: US 6,380,844 B2
(45) Date of Patent: *Apr. 30, 2002

(54) INTERACTIVE REMOTE CONTROL TOY

(76) Inventor: Frederick Pelekis, 15 Owatonna St., Haworth, NJ (US) 07641

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/140,239

(22) Filed: Aug. 26, 1998

(51) Int. Cl.[7] .................................................. G06F 7/00
(52) U.S. Cl. ...................... 340/5.8; 446/268; 446/297; 446/175; 345/474
(58) Field of Search .............................. 340/825.34, 5.8; 345/474; 446/268, 297, 454, 446, 175

(56) References Cited

U.S. PATENT DOCUMENTS

| | | | | |
|---|---|---|---|---|
| 5,452,901 A | * | 9/1995 | Nakada et al. | 446/454 |
| 5,855,483 A | * | 1/1999 | Collins et al. | 434/322 |
| 6,012,957 A | * | 1/2000 | Cyrus et al. | 446/446 |
| 6,022,273 A | * | 2/2000 | Gabai et al. | 345/474 |

* cited by examiner

*Primary Examiner*—Brian Zimmerman
*Assistant Examiner*—Yves Dalencourt
(74) *Attorney, Agent, or Firm*—Grimes & Battersby, LLP

(57) ABSTRACT

A remote control toy is provided for interacting with and responding to its environment. The remote control toy includes at least two wireless transmitters for generating unique control signals, wherein each of the transmitters is positioned in a different room or location in a child's environment. The transmitters each generate a unique infrared control signal by means of a light-emitting diode. A remote control device in the shape of a doll or other appealing configuration includes a battery-powered photodiode for receiving said control signals. The remote control device identifies the specific wireless transmitter that generated said control signal and generates a message or sound effect in response to the control signal appropriate for the specific location of the transmitter that generated the signal.

20 Claims, 2 Drawing Sheets

INTERACTIVE REMOTE CONTROL TOY

BACKGROUND OF THE INVENTION

1. Field of the Invention

The present invention relates generally to an interactive remote control toy, and, more particularly, to such an remote control toy that interacts with its environment by responding to external signals provided by a plurality of transmitters situated in various locations in the doll's environment. Each of the transmitters broadcasts a distinct signal which correlates to one or more programmed responses in the remote control toy. The strength of said signal is limited so as to prevent overlap of the signals from two or more transmitters.

2. Description of the Prior Art

The prior art fails to specifically address either the problem or the solution arrived upon by applicant. Remote control technology is well known and has been universally used for many years in the toy industry. Talking and moving dolls have been in existence for decades, as have dolls programmed to respond to external stimuli. For example, U.S. Pat. No. 3,274,729 which issued to C. Refabert on Jun. 17, 1964 for a Doll Having Photocell-Activated Sounding Means discloses a toy doll having a photo-conductive cell connected with a means for producing an audio signal when activated by irradiation of the cell with either visible or infra-red light. The incorporation of two optical sensors in a remote control toy to detect the intensity of light in first and second optical fields for the generation of audio signals in response to the differential in the intensity of light is disclosed in U.S. Pat. No. 4,659,919 which issued to W. Price on Apr. 21, 1987 for Optical Sensing Circuit for Audio Activation of Toys. An example of a toy having a receiver adapted to reproduce sound from a transmitter is illustrated in UK Patent No. GB 2 201 068 A which was published on Aug. 17, 1988 for Sound Reproducing Plaything and System. A remote control doll that is able to "read" specially encoded objects and to vocalize the sounds associated with each code is disclosed in U.S. Pat. No. 5,314,336, which issued to M. Diamond et al. on May 24, 1994 for Toy and Method Providing Audio Output Representative of Message Optically Sensed by the Toy.

There has been a recent trend in the toy industry in having remote control toys be responsive to signals received from the television or the video cassette recorder. For example, U.S. Pat. No. 4,840,602 which issued to Rose on Jun. 20, 1989 for Talking Doll Responsive to External Signal, discloses a doll programmed to audibly respond to portions of a narration from a remote signal source that may either come from a television or a cassette tape player. U.S. Pat. No. 5,1919,615 which issued to Aldava et al., on Mar. 2, 1993 for Interrelational Audio Kinetic Entertainment System discloses for movable and audible toys and other animated devices provided with program synchronized audio and control data to interact with the program viewer in relationship to a television program. Similar devices are disclosed in U.S. Pat. No. 5,636,994 which issued to V. Tong on Jun. 10, 1997 for Interactive Computer Controlled Doll and in U.S. Pat. No. 5,655,945 which issued to J. Jani on Aug. 12, 1997 for Video and Radio Controlled Moving and Talking Device.

As will be appreciated, none of these prior patents even address the problem faced by applicant let alone offer the solution proposed herein.

SUMMARY OF THE INVENTION

Against the foregoing background, it is a primary object of the present invention to provide a remote control toy that interacts with and responds to its environment.

It is another object of the present invention to provide such a remote control toy that promotes interaction between a child, the toy and the child's environment.

It is still another object of the present invention to provide such a remote control toy that encourages proper behavioral patterns in children.

It is another object of the present invention to provide such a remote control toy which has a plurality of infra-red transmitters to identify various locations in a child's environment.

It is another object of the present invention to provide such a remote control toy which acts as a parental aid to identifying meal times and bed times, and in identifying play areas and providing useful reminders.

It is but another object of the present invention to provide such a remote control toy in which each of the various transmitters generates a separate and distinct control signal from all the other transmitters.

It is yet still another object of the present invention to provide such a remote control toy in which audio effects or messages are played when control signals from the infra-red transmitters are received.

It is still another object of the present invention to provide such a remote control toy having a time-keeping means so as to play specific messages or sound effects at specific times of the day.

To the accomplishments of the foregoing objects and advantages, the present invention, in brief summary, comprises a remote control toy capable of identifying and responding to its environment. The remote control toy includes at least two wireless transmitters for generating unique control signals, wherein each of the transmitters is positioned in a different room or location in a child's environment. The transmitters each generate a unique infra-red control signal by means of a light-emitting diode. A remote control device in the shape of a doll or other appealing configuration includes a battery-powered photo-diode for receiving said control signals. The remote control device identifies the specific wireless transmitter that generated said control signal and generates a message or sound effect in response to the control signal appropriate for the specific location of the transmitter that generated the signal.

BRIEF DESCRIPTION OF THE DRAWINGS

The foregoing and still other objects and advantages of the present invention will be more apparent from the detailed explanation of the preferred embodiments of the invention in connection with the accompanying drawings, wherein.

DETAILED DESCRIPTION OF THE INVENTION

Figure 1:
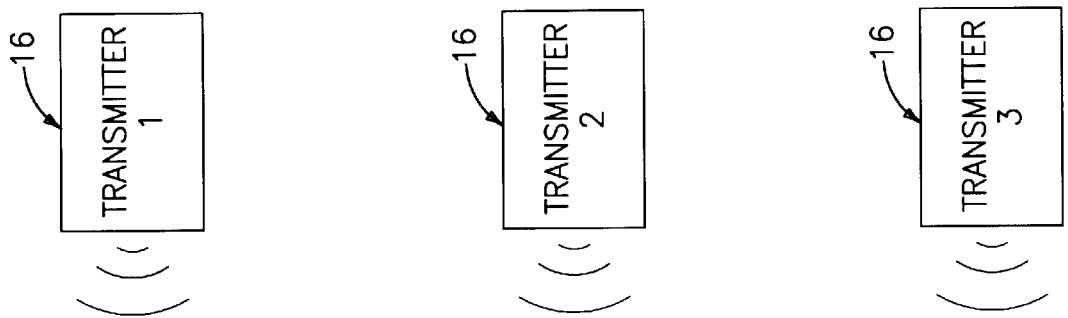
FIG. 1 is a schematic view of the remote control toy of the present invention.
Figure 1:
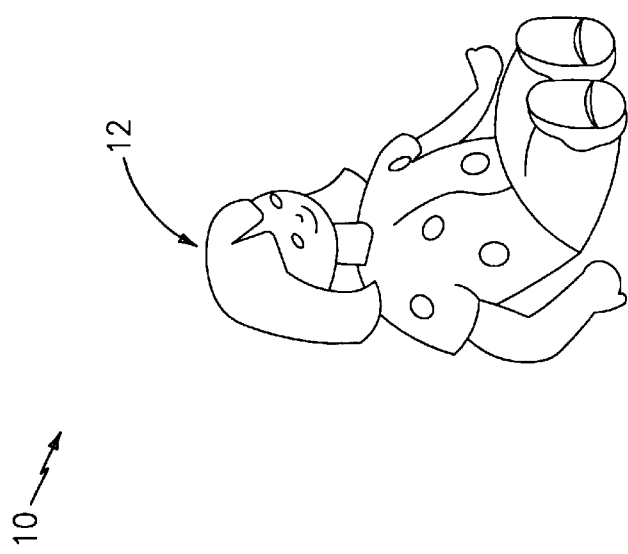
Figure 2:
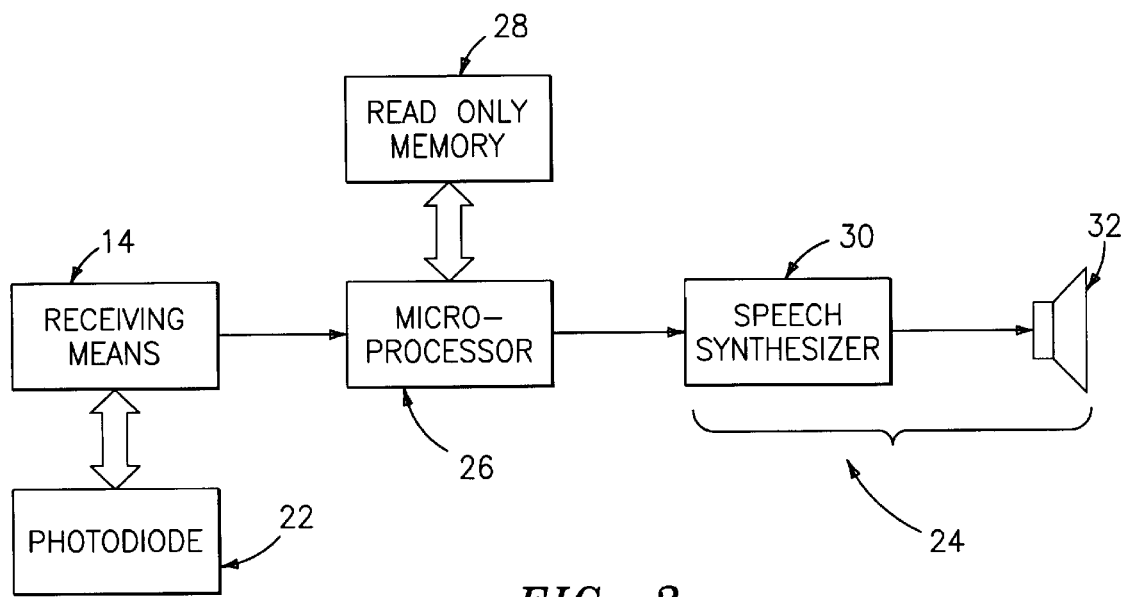
FIG. 2 is block diagram of the remote control device of the present invention.
Figure 3:
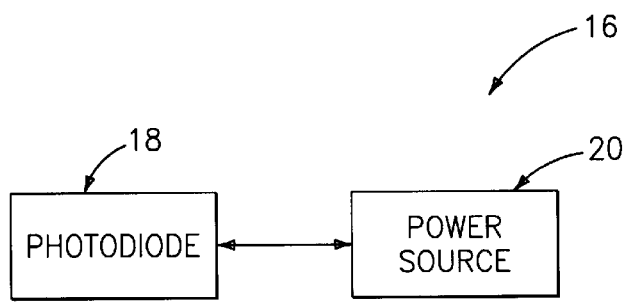
FIG. 3 is a block diagram of the transmitting means of the present invention.

Referring to the drawings and, in particular, to FIGS. 1 and 2 thereof, the interactive remote control toy of the present invention, referred to generally by reference numeral 10, is illustrated. The toy 10 comprises a remote control device 12 having a receiving means 14 incorporated therein adapted to receive control signals generated by transmitters 16. The receiving means 14 is situated in the remote control device 12 so as to allow it to receive the control signals without obstruction. For example, the receiving means 14 may be housed behind transparent eyes. In the preferred embodiment of the invention the remote control device 12 is a doll. However, it should be appreciated that the remote control device 12 may be any shape that would be appealing to a child, such as a teddy bear or a dinosaur.

In the preferred embodiment of the present invention, the transmitters 16 generate continuous or intermittent infra-red control signals by means of light-emitting diodes 18 powered by transmitter power source 20. It should be appreciated, however, that other remote signaling means may also be utilized, such as visible light or radio frequency (RF) means or digital transmission means.

Each transmitter 16 emits a continuous or intermittent control signal that is distinct from the signals of the other transmitters 16. In this way, each transmitter 16 can serve to "identify" the specific geographic location of the particular transmitter 16. For example, a transmitter 16 may be provided to identify a child's bedroom, the kitchen or the child's play area.

The strength of the signal generated by each transmitter 16 is relatively weak so as to prevent overlap of the signals from two or more transmitters 16 and to limit the drain on the transmitter power source 20. The frequency of the control signals generated by transmitters 16 may also be varied so as to limit the drain on the transmitter power source 20. For example, rather than a continuous signal, the transmitters 16 may generate a control signal every five minutes. In an alternate embodiment of the invention, the transmitters 16 would be equipped with motion detectors so that they would generate control signals unless there was movement in the room, indicating the child was in the room.

The receiving means 14 in the preferred embodiment of the remote control device 12 includes a photodiode 22 sensitive to the infra-red control signals produced by the transmitters 16. The remote control device 12 further includes a speech generating system 24 which comprises a microprocessor 26 electronically coupled with the receiving means 14. Also coupled with the microprocessor 26 are a read-only memory (ROM) 28 and a speech synthesizer 30 which provides electronic output to a speaker 32. Both the photodiode 22 and the speech generating system 24 are powered by a power source 34. It should be appreciated that if the transmitters 16 generated control signals by other means than an infra-red signal, such as by radio frequency (RF) means, the receiving means 14 would necessarily require a means for detecting such signal, such as a RF receiver.

In the read-only memory 28 are digitally stored a variety of messages and sound effects, grouped into several categories, each category appropriate for each of the particular transmitters 16. For example, there may be several messages that identify the child's bedroom, such as "I'm tired" or "Let's go to bed," or for the kitchen, such as "Mmmm, I'm hungry." When the photodiode 22 in the remote control device 12 receives a control signal from one of the transmitters 16, the signal is transmitted to the microprocessor 26 which decodes the signal to determine the specific transmitter 16 that generated the signal. The microprocessor 26 then accesses the read-only memory 28 and randomly chooses one message from the series of messages appropriate for the particular transmitter 16. This digital message is then relayed to the speech synthesizer 30 which converts the message to an analog form and the message is played through speaker 32.

In the preferred embodiment of the present invention, the speech generating system 24 would be programmed so as to prevent the messages from being repeated each time the remote control device 12 receives a control signal from one of the transmitters 16 in the case of an intermittent control signal, as well as from constantly repeating the message where the control signal is continuous. Such programming may also allow a message to be broadcast every ten to fifteen minutes.

In an alternate embodiment of the invention, the read-only memory 28 would be replaced with an interchangeable digital disk upon which the various messages are digitally recorded. These disks could be specifically directed to boys or girls of specific age groups and interests. Furthermore, such digital disks may also be recordable, so the child's parents can record personalized messages for the remote control device's 12 response. Similarly, voice recordable integrated circuit chips may also be utilized for the recording and playback of messages. The digital disks could be replaced so as to reflect a change in the child's environment (such as visiting the child's grandparents' house) or to adapt the interactive remote control toy 10 to the child's growing older.

In the embodiments having voice recordable chips or digital disks, messages pertaining to specific interests, such as sports or music, as well as specific problems, such as bed-wetting or potty training, may be downloaded and saved to the recordable media via a global computer network, such as the Internet.

In an alternative embodiment, the transmitters 16 may also be fitted with a time keeping means (not shown) such as a clock. The signal generated by the transmitter 16 would change depending upon the time of day. For example, if a transmitter 16 was located in the kitchen, the transmitter 16 may generate one signal at the child's breakfast time, another signal at the child's lunch time and yet another at a child's dinner time. The transmitter 16 located in the child's bedroom could generate one signal at the child's bed time and another at the time the child is to wake up. The message played by the remote control toy 10 would be dependant upon the time of day—for instance, at breakfast time, the message could be "Let's have some breakfast." In such embodiment, the interactive remote control toy 10 would serve as a parental aid as well as an alarm clock. By determining when and where children perform certain activities, the remote control toy 10 could help parents to encourage proper behavioral patterns in the child.

A variation of this embodiment would be to incorporate the time-keeping means within the remote control device 12 itself rather than in the transmitters 16. Still another variation of this embodiment would be to include a detector within either the transmitters 16 or the remote control device 12 to use the frequencies emitted by the atomic clock in Colorado.

In yet still another embodiment of the present invention, the remote control device 12 may also include a motor and series of linkages (not shown) to drive the various appendages of the remote control device 12 in order to simulate movement appropriate for the particular form of the remote control device 12. For example, if the remote control device 12 were a doll, the motor and linkages could cause a doll's arms and legs to move. The memory 28 of the remote control device 12 would contain movement data in addition to the sound data so as to integrate the sound and movement of the doll. For example, at the child's bed time, the doll might say "good night" and close its eyes. If the remote control device 12 were in the shape of a dog, the motor and linkages may cause the dog's tail to wag.

Having thus described the invention with particular reference to the preferred forms thereof, it will be obvious that various changes and modifications can be made therein without departing from the spirit and scope of the present invention as defined by the appended claims.

What is claimed is:

1. A remote control toy capable of independently interacting with its environment, said toy comprising:
   at least two wireless transmitters for independently and continuously generating a control signal unique to each of said transmitters, each of said transmitters situated at different locations in said environment; and
   a remote control device including:
      a receiver for receiving said control signals;
      a means to identify the location of said remote control device in its environment by identifying the specific wireless transmitter that generated said control signal;
      a means for generating at least one programmed operation in response to said control signal from each of said specific wireless transmitters, said programmed operation being tailored individually for each of said different locations; and
      a means for preventing said remote control device from continuously generating said at least one programmed operation in response to said control signal.

2. The remote control toy of claim 1, wherein said wireless transmitters include a light-emitting diode for emitting infra-red control signals.

3. The interactive remote control toy of claim 2, wherein said light-emitting diode produces a continuous infra-red control signal.

4. The interactive remote control toy of claim 2, wherein said light-emitting diode produces an intermittent infra-red control signal.

5. The remote control toy of claim 2, wherein said control signals generated by said transmitters are unique to each of said transmitters.

6. The remote control toy of claim 1, wherein said receiver comprises a battery-powered photodiode.

7. The remote control toy of claim 1, wherein said means for identifying comprises a microprocessor.

8. The remote control toy of claim 1, wherein said programmed operation consists of the generation of a message or sound effect.

9. The remote control toy of claim 8, wherein said means for generating includes an information storage medium coupled with a digital playback means.

10. The remote control toy of claim 9, wherein said magnetic storage medium consists of a read-only memory.

11. The remote control toy of claim 9, wherein said magnetic storage medium consists of a programmable digital disk.

12. The remote control toy of claim 11, wherein said programmable digital disk is recordable.

13. The remote control toy of claim 9, wherein said magnetic storage medium consists of a voice recordable integrated circuit chip.

14. The remote control toy of claim 9, wherein said means for generating further includes a means for downloading said message or sound effect from a global computer network.

15. The remote control toy of claim 9, wherein said digital playback means consists of a speech synthesizer coupled with a speaker.

16. The remote control toy of claim 1, wherein said programmed operation consists of the motorized movement of said remote control device.

17. The remote control toy of claim 1 further including a time-keeping means integral with a microprocessor.

18. The remote control toy of claim 17, wherein said microprocessor determines the specific programmed operation in response to said control signals based upon the time information provided by said time keeping means.

19. A remote control toy capable of independently interacting with its environment, said toy comprising:
   at least two wireless transmitters for independently and continuously generating a control signal unique to each of said transmitters, each of said transmitters adapted to be situated at different locations in said environment, wherein said transmitters include a light-emitting diode for emitting continuous or intermittent infra-red control signals unique to each transmitter; and:
   a remote control device including:
      a receiver comprising a battery-powered photodiode for receiving said control signals;
      a means to identify the location of said remote control device in its environment by identifying the specific wireless transmitter that generated said control signal, wherein said means for identifying comprises a microprocessor;
      a means for generating at least one programmed operation in response to said control signal from each of said specific wireless transmitters, said programmed operation being tailored individually for each of said different locations, wherein said means for generating includes a magnetic storage medium coupled with a digital playback means; and
      a means for preventing said remote control device from continuously generating said at least one programmed operation in response to said control signal.

20. A method for a remote control toy to independently respond to its environment, said method comprising the steps of:
   positioning at least two wireless transmitters for independently and continuously generating a control signal unique for each of said transmitters, each of said transmitters being positioned at separate locations, said control signals serving to identify each of said locations;
   receiving said control signals by said remote control toy;
   identifying the location of said remote control device in its environment by identifying the specific wireless transmitter that generated said control signals and determining the specific location identified by said control signal; and
   generating at least one programmed operation in response to said control signal from said specific wireless transmitter, said programmed operation being tailored individually for each of said locations.

* * * * *